April 21, 1959 P. H. KOCH 2,882,871
VAPOR GENERATING AND SUPERHEATING UNIT WITH RECIRCULATED
GAS INTRODUCTION TO A PULVERIZED COAL FIRED
FURNACE FOR SUPERHEAT CONTROL
Filed Jan. 25, 1954 5 Sheets-Sheet 1
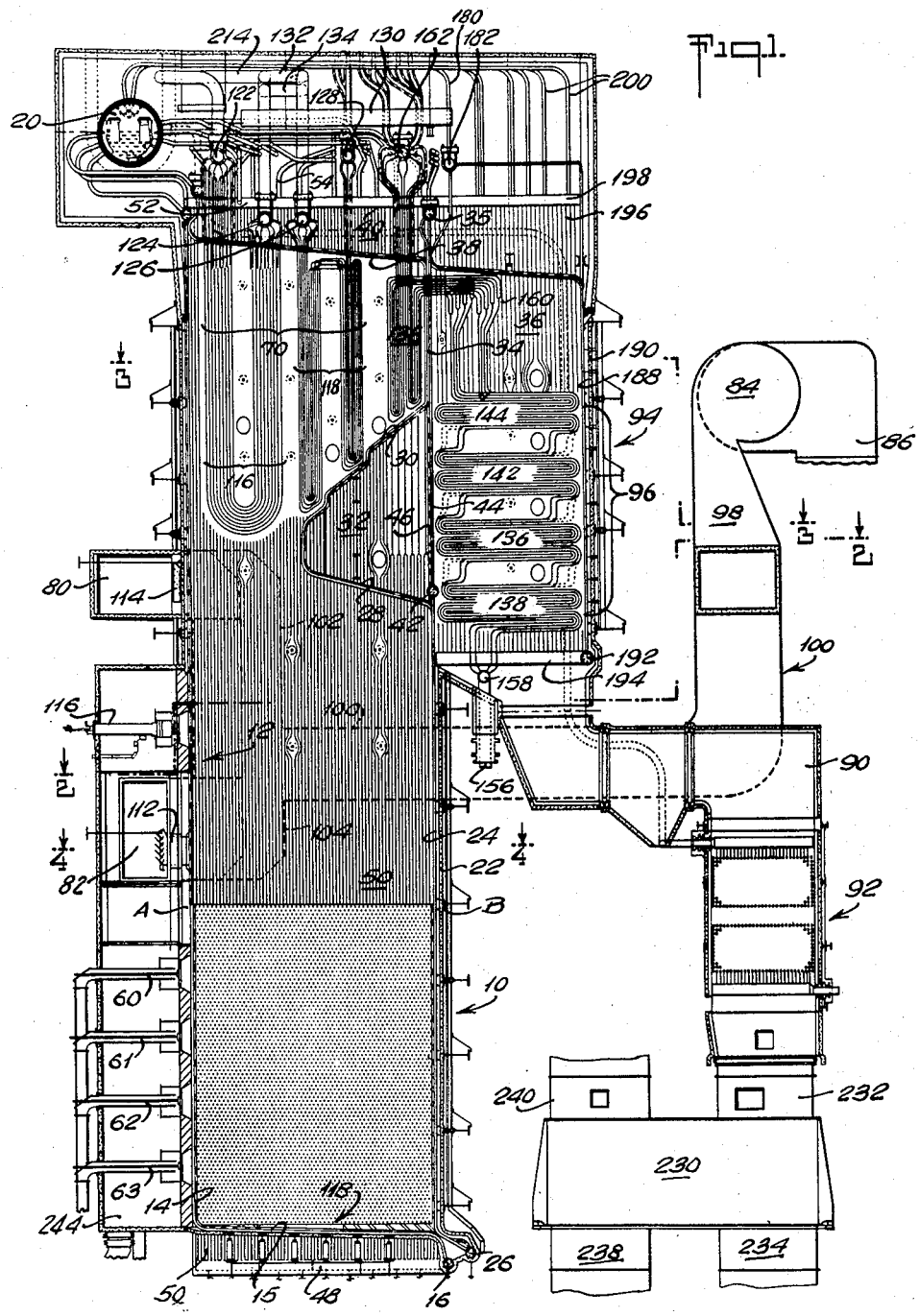
INVENTOR
PAUL H. KOCH.
BY
ATTORNEY

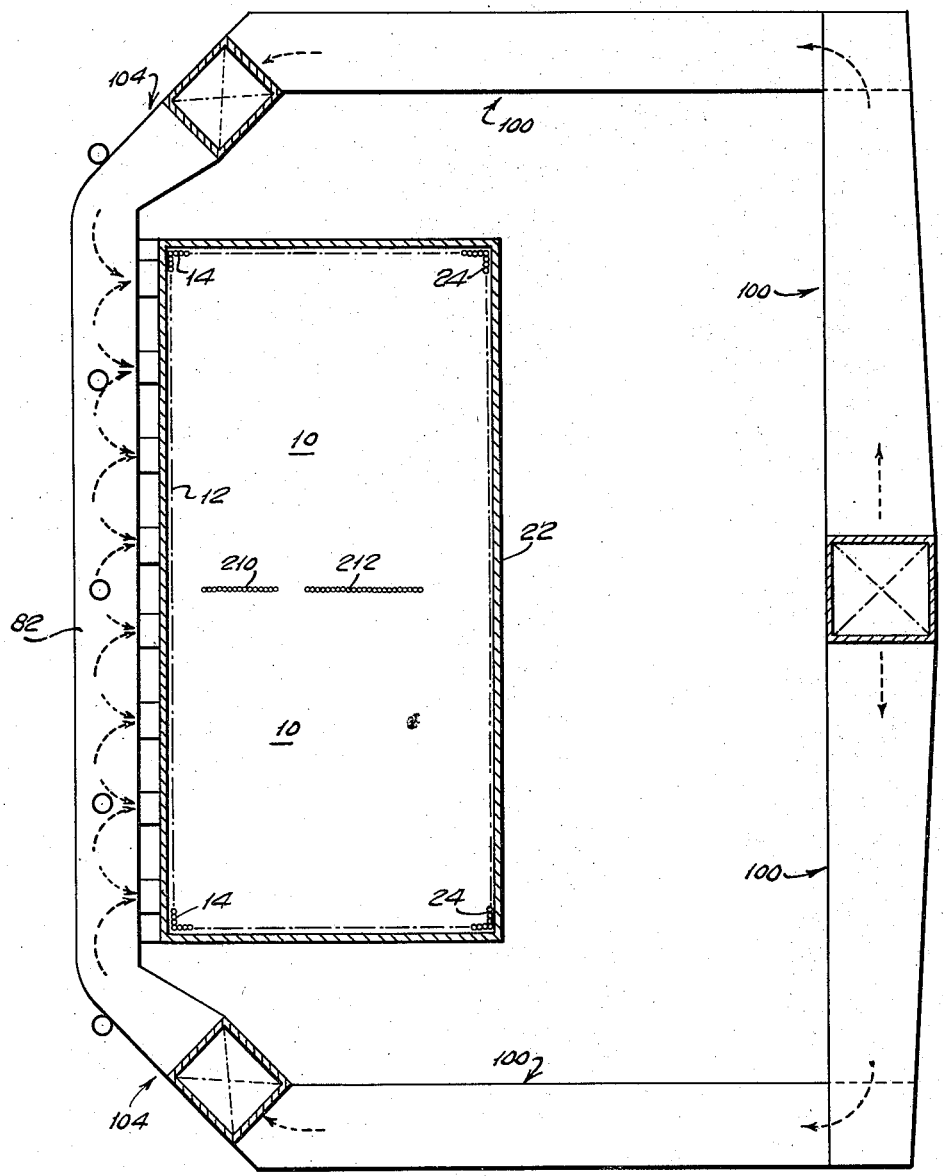

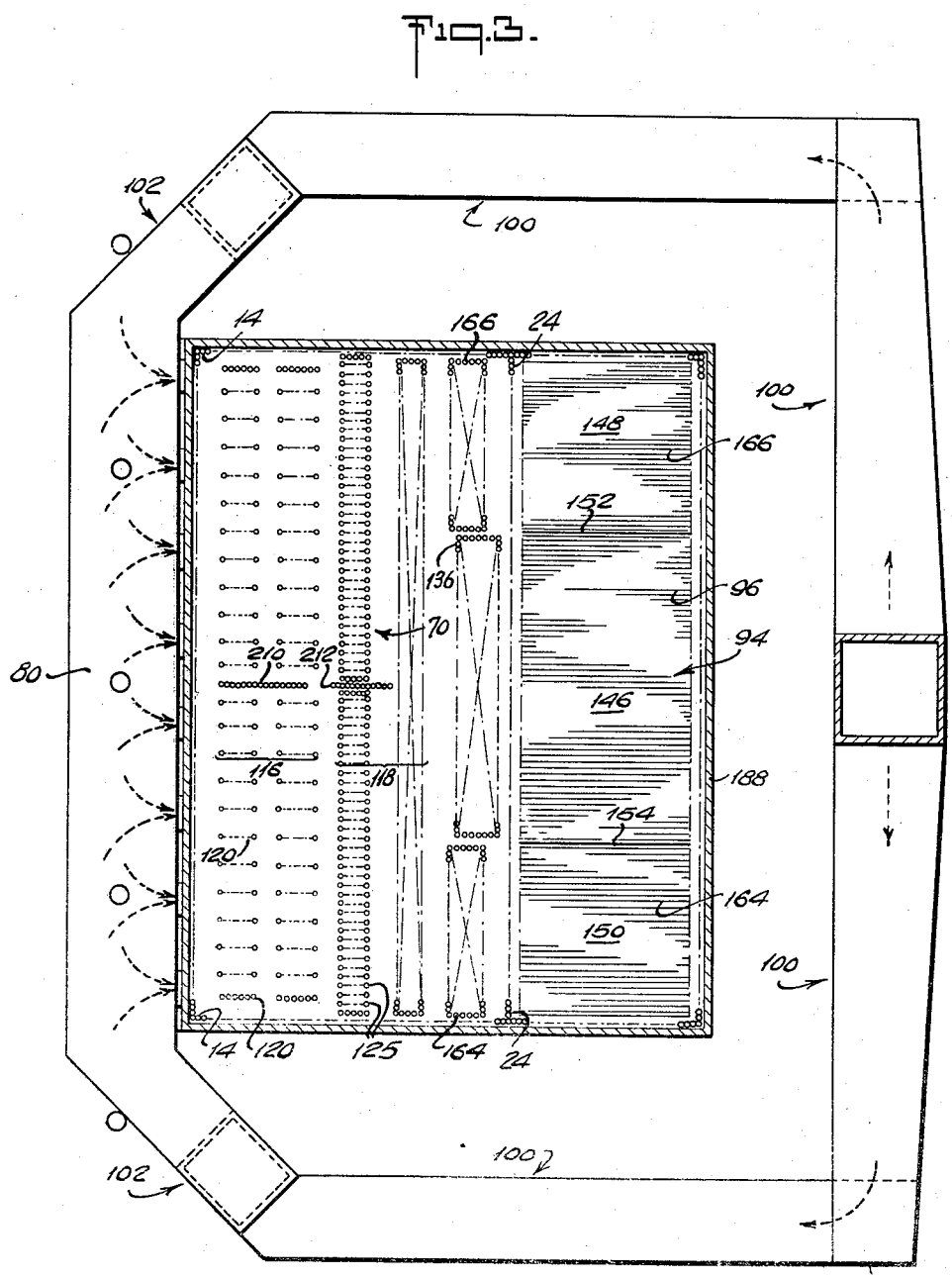

April 21, 1959
P. H. KOCH
2,882,871
VAPOR GENERATING AND SUPERHEATING UNIT WITH RECIRCULATED
GAS INTRODUCTION TO A PULVERIZED COAL FIRED
FURNACE FOR SUPERHEAT CONTROL
Filed Jan. 25, 1954
5 Sheets-Sheet 4
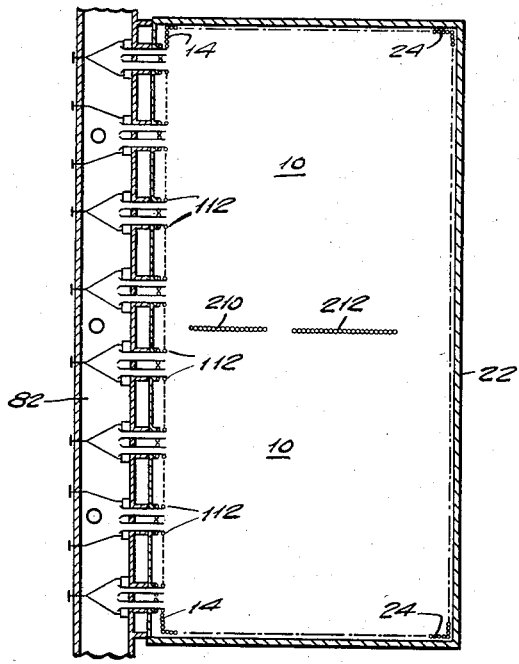
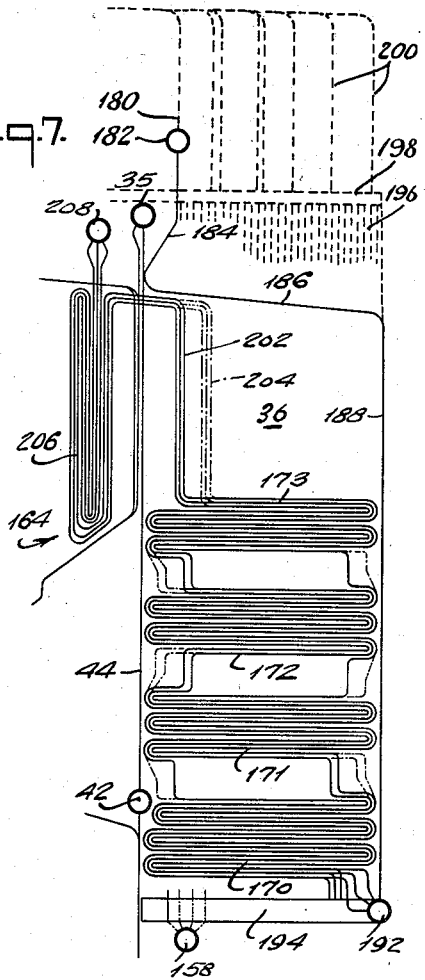
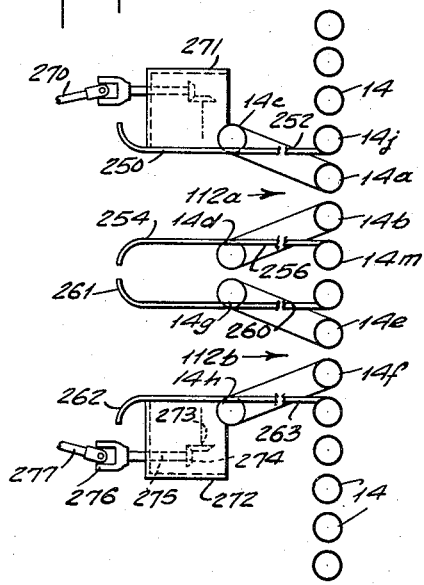
INVENTOR
PAUL H. KOCH.
BY
ATTORNEY

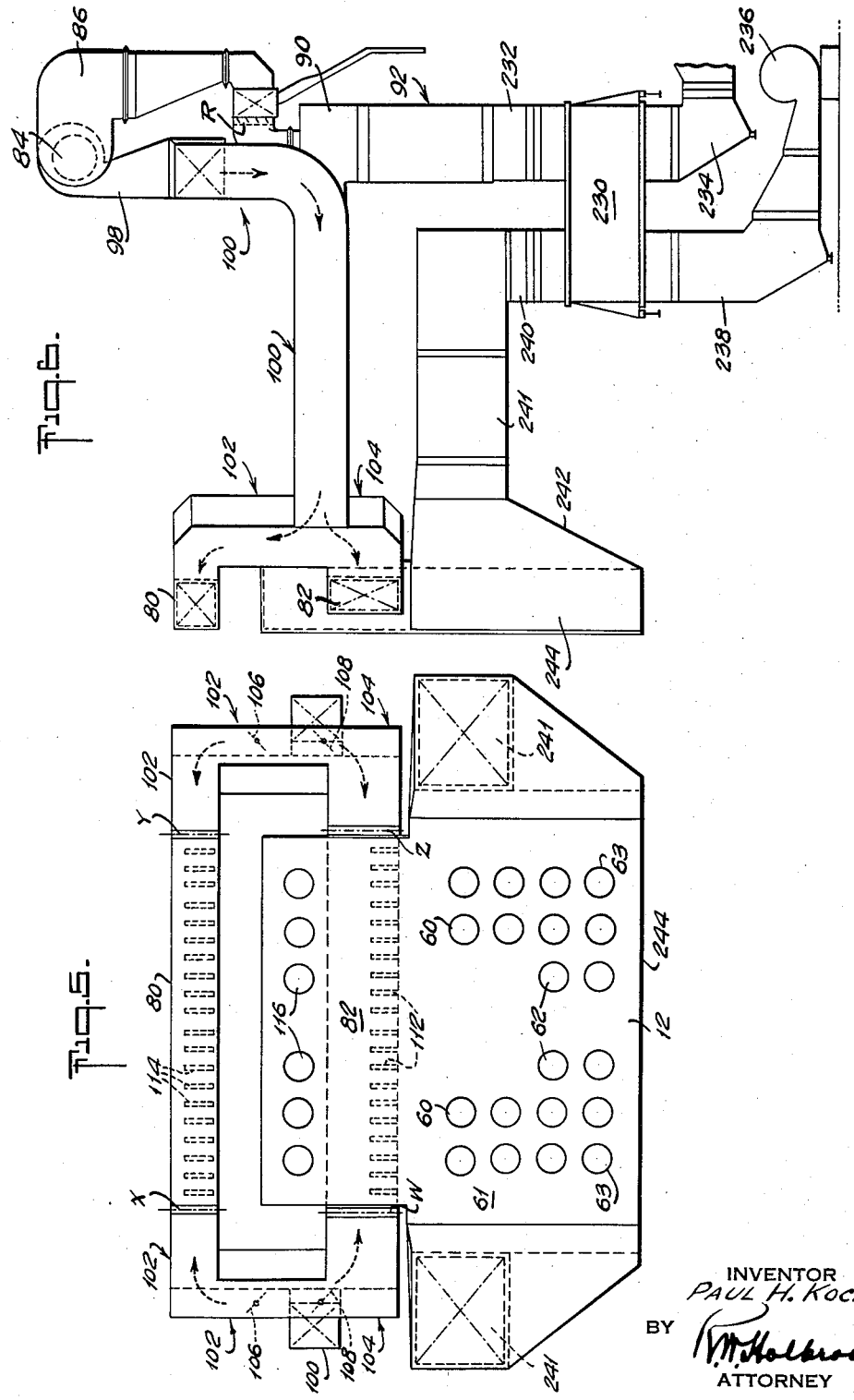

United States Patent Office 2,882,871
Patented Apr. 21, 1959

2,882,871

VAPOR GENERATING AND SUPERHEATING UNIT WITH RECIRCULATED GAS INTRODUCTION TO A PULVERIZED COAL FIRED FURNACE FOR SUPERHEAT CONTROL

Paul H. Koch, Bernardsville, N.J., assignor to The Babcock & Wilcox Company, New York, N.Y., a corporation of New Jersey Application January 25, 1954, Serial No. 405,794

10 Claims. (Cl. 122—478)

This invention relates to apparatus for generating vapor at high temperatures and pressures and superheating the generated vapor to high temperatures.

The pertinent vapor generation preferably takes place as a result of absorption by furnace wall tubes of heat radiantly transmitted from products of combustion within a furnace; the vapor thus generated is separated from the vaporizable liquid issuing from the wall tubes; and the vapor subsequently superheated to a temperature of the order of 1050° F.

To attain superheat temperatures of the pertinent order high furnace temperatures are necessary, and it is also necessary that the vapor in the superheating zone be exposed to furnace temperatures of the highest possible temperature consistent with superheater operation which does not detract from a high degree of availability of the vapor generating and superheating unit. This necessity of causing the vapor to be superheated in a high temperature zone involves difficulties with reference to heat transfer rates and superheater metals temperatures, and these difficulties are particularly pronounced when the furnace is fired by the burning of pulverized coal at temperatures above the fusion temperature of the incombustible particles in the coal. If such particles remain at such high temperatures they have a sticky condition which would cause them to adhere to the surfaces of a convection superheater, and accumulate thereon. One of the objects of the present invention is to reliably and effectively obtain the pertinent high superheat which at the same time, minimize such slag accumulations on the surfaces of the superheater.

The prior art has involved suggestions as to the provision of convection heated banks of tubes as slag screens between pulverized fuel burners and the superheater for alleviating the pertinent slagging difficulties, but such substantial heat absorption that high superheat temperature of the present invention would not be obtainable. Hence this invention involves no such slag screen, but, contrariwise, provides a superheater having a section absorbing heat directly radiantly transmitted from the burning fuel, this section partaking of radiant heat absorption conditions similar to those pertaining to the vapor generating furnace walls. When, at low loads, such furnace wall heat absorption would otherwise be too high relative to the heat absorption in superheating and reheating, the present invention involves the introduction of partially cooled furnace gases to decrease the ratio of furnace absorbed heat to superheat and reheat absorbed heat, increasing the gas mass flow over the entire superheater to relatively increase superheat, without reduction of furnace temperature in the slag removal zone, below a value at which fused slag flows from the furnace.

This invention effects vapor generation and vapor superheating in such a manner that furnace volume and the extent of furnace wall cooling surfaces are minimized, while, for optimum combustion conditions, maximum furnace gas temperatures are maintained at values above the safe value for utilization in convection vapor superheating over a wide load range. The invention accomplishes these results by continuously producing furnace gases in the slag disposal zone of the furnace, at a temperature well above gas temperatures safe for gas entry and passage over the convection superheater, and by reducing the gas temperatures to a safe convection superheating value, before the gases pass through the superheating zone. Such reduction of gas temperature is effected by the introduction of recirculated and partially cooled furnace gases into the furnace at a position between the superheater and pulverized fuel burners, and the mixing of the recirculated gases and the unrecirculated gases ahead of the superheater, and without the interposition of a slag screen of vapor generating tubes.

Another factor involved in the illustrative unit is that it develops vapor at the pertinent high temperature and high pressure in order that the optimum cycle efficiency of the pertinent power plant may be approached, with consequent optimum reduction of the ultimate cost of developed power, said cost reduction being also caused, in part, by an approach to a maximum of power generation within a minimum space and at an attendant lower cost of initial installation.

The present invention not only provides for high availability in a pulverized fuel fired and high steam temperature steam generating and superheating unit, but it also provides for the effective operation of the illustrative unit over a wide load range. When such a unit involves a high capacity convection vapor superheater subject to the flow of high temperature gases from the furnace, the pertinent steam turbine of the associated power plant components is designed to receive superheated steam of the illustrative temperature, and the efficiency of the entire power plant is substantially decreased in the event of a substantial drop in such temperature and, in this connection, it is to be appreciated that any convection superheater has such inherent characteristics that when the steam demand on the unit decreases the rate of firing the furnace decreases, the flow of gases over the superheater is correspondingly decreased with a resulting lowering of the steam temperature at the superheater outlet. The present invention provides for the simultaneous attaining of the pertinent high superheat and high availability operation and, at the same time, provides for the counter-acting of the above indicated inherent tendency of the convection superheater to the end that a predetermined final steam temperature may be maintained over a wide range of load variation.

The above indicated results are attained by the invention in a high capacity unit operating at 2700 p.s.i.a., at 1100° F. superheat, and 1050° F. reheat. The illustrative unit has a capacity of 1,350,000 pounds steam per hour. It also involves a high temperature slag tap furnace with its walls and floor including vapor generating tubes, preferably covered in the high-temperature and slagging zone, with high temperature refractory. The gases pass upwardly from the furnace over a convection superheater, the surfaces of which are exposed to furnace gases, and thereafter the gases pass over reheater surface, primary superheater surface, economizer surfaces, and air heater surfaces. To generate full load in the illustrative high capacity unit the furnace is fired in its slagging zone by a plurality of rows of pulverized fuel burners disposed so as to maintain high temperatures and stable combustion within that zone. Intermediate that zone and the zone of the superheater, partially cooled gases of combustion products are projected transversely of the furnace gas flow to reduce the temperature of the furnace gases to a point where the superheater will not be injured by the high temperatures, per se, or by the resultant development of gas suspended particles of incombustible resulting from those high temperatures.

The illustrative unit also involves other fuel burners disposed along the furnace wall at an elevation above the elevation of the above indicated entry of recirculated and partially cooled combustion products. These other burners may be oil or gas burners, and in the latter case, there is no necessity for cooling the gases to prevent the suspension therein of fused particles of incombustible. However, the furnace gas temperatures at the outlet of the furnace and immediately in front of the superheater zone may be so high even without suspended particles of incombustible therein that there would be apt to be superheater metal damage. Such damage, in the illustrative unit, is prevented by the provision for the introduction into the furnace gas stream at the pertinent location immediately in front of the superheater zone of partially cooled gaseous combustion products delivered in controlled quantities from a position in the gas flow stream, downstream of the superheater.

The invention is concisely and clearly set forth in the appended claims, but, for a complete understanding of the invention, its modus operandi, and advantages, recourse should be had to the following description in which there are reference characters corresponding to those in the accompanying drawings.

In the drawings:

Fig. 1 is a sectional elevation of an illustrative steam generating and superheating unit;

Fig. 2 is a horizontal section on the line 2—2 of Fig. 1, modified to show the recycled gas ductwork system;

Fig. 3 is a partial horizontal section on the line 3—3 of Fig. 1, showing the arrangement of superheater elements and modified to show the recirculated gas system;

Fig. 4 is a horizontal section on the line 4—4 of Fig. 1;

Fig. 5 is a partial elevation of the burner wall, showing the arrangement of the parts of the recycled gas systems;

Fig. 6 is a partial side elevation showing particularly the recycled gas systems, the air heater, and the ductwork for secondary air;

Fig. 7 is a partial vertical section showing the structure of a primary superheater section, one of which is disposed in each of the outside or end gas passes of the three downflow convection passes; and Fig. 8 is a detail view showing, on an enlarged scale, the structure of the recycled gas ports.

In Fig. 1, there is indicated a high pressure and temperature vapor generating and superheating unit of high capacity (i.e., pressure of the order of 2400 p.s.i.; vapor superheat temperature of the order of 1100° F.; and capacity of the order of 1,350,000 pounds of vapor per hour). The illustrative unit is of the radiant boiler type, having a large volume vertically elongated furnace 10 the walls and other boundary surfaces of which are preferably defined by vapor generating tubes. The furnace 10 has a burner wall 12 including the upright tubes or tubular sections 14 integral with the floor tube sections 15 leading from the lower header 16 across the floor 18 to the burner wall 12. These tubes or tube sections form parts of integral and separate flow paths for the separate flows of a vaporizable liquid (i.e., water) directly from the header 16 to the drum 20.

Similarly, the opposite furnace wall 22 has upright vapor generating tubes 24 leading directly from the floor header 26, along the lower and upper sides 28 and 30, respectively, of the arch 32, thence as upright screen tubes 34 across the horizontal gas flow to the gas turning space 36, and then as roof tube sections 38, along the roof 40 of the superheater gas chamber to the drum 20. Some of the upright vapor generating tubes along the wall 22 terminate in header 42 from which other upright tubes 44 lead along the wall 46 then continue upwardly in spaced relation to the screen tubes 34, and then to the header 35 which has appropriate connections with the drum 20.

The side walls of the furnace similarly include vapor generating tubes leading from headers to the drum 20. One such side wall header is indicated at 48, and this header with its opposite counterpart, may be integral with the header 16 to form a unitary U-shaped header. The side wall tubes 50, leading upwardly from header 48 have their upper ends expanded into an upper side wall header 52, connected to the drum 20 by appropriate circulators 54.

The illustrative furnace is fired by vertically spaced horizontal rows of pulverized fuel burners 60—63 receiving pulverized coal and primary air mixtures through appropriate conduits from pertinent sources. These burners are disposed in the furnace wall 12 at the lower part of the furnace where the walls and floor are lined with high temperature refractory to protect the vapor generating tubes and to maintain the fluidity of the slag resulting from the fusion of the incombustible of the fuel. Preferably, this slag covers the floor 15 from which it flows to an exit, including a slag pit (not shown).

The burner zone of the furnace constitutes the zone of highest furnace temperatures, too high, at full load, for safe contact of furnace gases at or near that temperature with the tubes of the secondary superheater 70 from which steam (or vapor) flows to a point of use. Hence, the combustion products must have their temperatures lowered before this superheater is reached. Such lowering of gas temperatures is effected by the injection into the furnace of partially cooled heating gases taken from the gas flow path at a position downstream of the superheater. The partially cooled heating gases, thus recycled, are controllably distributed, as to their zones of furnace entry, between the positions of the gas entry chambers 80 and 82 which receive the recycled gases from the same fan 84. The inlet of the fan is connected by ductwork 86 to the breeching 90 disposed between the economizer 92 and the convection downflow gas pass means 94 which includes the reheater 96.

The flow of recycled gas from the fan outlet 98, is directed through ductwork 100 and this flow is then divided between the ductwork 102, leading to the entry chamber 80, and ductwork 104 leading to the entry 82. Such division of the recycled gas flow may be controllably effected by selective operation of the gas flow regulators 106 and 108, in the respective ductwork divisions 102 and 104. Preferably, the regulators 106 and 108 are automatically controlled by control system influenced by load, furnace outlet temperature and superheat (or final) steam temperature, or variable influences representing variations of the specified influences. Preferably, this control system involves constant speed operation of fan 84 and the variation of recycled gas flow in each of the ductworks 102 and 104. When the load increases toward maximum load the flow of recycled gas to the tempering gas entry chamber 80 is increased to a maximum and the recycled gas flow through the ductwork to the recirculated gas entry chamber 82 is decreased until a predominant proportion, or all, of the recycled gas flows into the furnace through the entry 80. This condition obtains when there is a maximum of heat input by the burners, whether burning pulverized coal, gas or oil. In this connection it may be stated that the burners may all be combination burners, adapted to burn any one of these fuels. Furthermore when pulverized coal is burned, slag collects along the furnace floor, and the fluid condition of this slag (for accumulation and disposal) is promoted by the refractory lining of the furnace walls (below the level A—B, Fig. 1), and by the absence of recycled gas entry in such a manner as to have any substantial cooling effect upon the lower portion of the furnace.

The illustrative furnace entry of recycled gases not only minimizes any cooling of the slagging zone of the furnace, but it also has two other important effects, The first is the conditioning of the gas suspended particles of fused incombustible. As such particles leave the slagging zone of the furnace they become sticky to such an extent that they would accumulate upon the tubes of the secondary superheater 70 if they remained in this condition while contacting those tubes. Such accumulation would result in obstruction of the gas flow passages between the tubes, and would decrease heat transfer rates and ultimately result in tube damage. Such undesirable effects are minimized by the entry of recycled gases and their contact with the suspended particles to cool them to such an extent that their stickiness is minimized by the time that they reach the superheater. This effect is increased by increasing the proportion of recycled gases flowing into the furnace through the inter-tube ports 112 leading from the entry chamber into the furnace. The other effect is the introduction and mixing of the recycled gases with the gases directly issuing from the burners so that the temperature of the gases as they contact the tubes of the superheater 70 has a value within a safe range, as relates to the superheater tube metal. This range depends upon the characteristics of the metal of the tubes, and the illustrative method of recycled gas entry is characterized by such sensitivity of control, due to the proportioning of the total recycled gas flow from the two entry chambers 80 and 82, and due to the relation of the recycled gas entry ports to the burners and the arch 32, that the temperature of the recycled gases may be controlled within narrow limits. This control also promotes a reduction in initial cost of the illustrative unit by minimizing the amount of expensive metallic alloy necessary to effect final steam temperature of the order of 1100° F. The relation of the ports 114 leading from the chamber 80, to the burners, and to the arch 32, is such that eddy currents are set up to promote quick and substantial mixing of the newly developed burner efflux gases with the tempering gases. This result is also promoted by the high velocity of the tempering gases entering the furnace from entry 80.

The above indicated results are enhanced by the furnace entry of recirculated gases through the ports 112 from the entry 82. The recycled gas streams from these ports are not only embraced by the efflux of burners such as the oil burners 116, and the combination burners 60, et seq., but the remoteness of these streams and the remoteness of the burners 60—63, relative to superheater 70, provides for added residence time of the gases within the furnace confines, to further promote the conditioning of the combustion products and the lowering of the temperature of the heating gases before they contact the superheater.

The maximum furnace temperatures in the slagging zone (below the A—B level) will exist at highest rates of vapor generation, or load, and it is at this time that the highest percentage of recycled gases pass through the ports of highest velocity, the ports 114, for maximum cooling effect, and maximum protection of superheater metal. As the rates of firing, or total heat input decreases, with decrease in load, an increasing percentage of the total recycled gas flow enters the furnace through the lower velocity ports 112, leading from the recirculated gas entry 82.

The secondary superheater, indicated as entirety by the numeral 70, has two sections, 116 and 118, and to further remote a high degree of availability of the unit by preventing slag bridging of the platens, under slagging conditions, the first, or low temperature section 116 of this superheater is formed by U-tube platens 120 which are widely spaced, transversely of upward gas flow thereover (as shown in Fig. 3). The U-tubes of each platen are nested as indicated in Fig. 1, with their parallel legs extending through the roof 40. Above the roof, corresponding U-tube legs are connected to an inlet header 122, and the corresponding outlet legs of the U-tubes are connected to an outlet header 124, for the superheater section 116.

After leaving the first secondary superheater section 116 the high temperature heating gases, with their suspended incombustible particles in non-sticky condition, pass between and over the tubes of the banks of horizontally spaced upright tubes forming the second section of the secondary superheater 118. The tubes of this section depend in more closely spaced platens 125, from the inlet header 126 and the outlet header 128, supported from appropriate steel work 130. The inlet header 126 of the superheater section 118 receives steam from the header 124 through crossover conduits 132 and 134. These conduits lead from the quarter points of header 124 to the reversely arranged quarter points of the header 126 for the purpose of minimizing unbalance of steam temperatures which might otherwise occur.

From the outlet header 128 the steam at a temperature of the order 1100° F. passes to a point of use, i. e., the steam turbine of a turbo-electric power plant.

After heating gases have passed over the upright tubes of the second section 118 (Fig. 1) of the secondary superheater they next contact and pass over and between the components of the bank of tubes 136 constituting a part of the reheater which is indicated, as entirety, by the numeral 96. Other parts of the reheater include the banks 138, 140, 142 and 144 of horizontal tubes which are indicated as substantially vertically spaced, in Fig. 1. These banks of tubes are disposed in middle downflow gas pass 146 (Fig. 2) on either side of which are parallel and symmetrically arranged side down passes 148 and 150 for the primary superheater sections. Appropriate upright wall means 152 and 154 separate the side down passes 148 and 150 from the middle downflow pass 146 (see Fig. 2).

The reheater 96 receives exhaust steam from a high pressure turbine (or an intermediate turbine stage). This steam passes through the reheater inlet conduit 156 to the inlet header 158 from which it passes through the series connected tubes constituting, in succession, the banks 138, 140, 142 and 144 of horizontal tubes and the bank 136 of upright tubes. The latter are 1¾ O.D. tubes and the number of these tubes is twice the number of tubes constituting the banks 138, 140, 142, and 144. The latter tubes are 2½" O.D. tubes having bifurcations 160 joining them to the inlets of the tubes constituting the bank 136 of upright reheater tubes. The latter tubes are expanded into a reheater outlet header 162 from which reheated steam passes to a low pressure turbine stage. This bifurcated construction affords a substantial reduction in pressure drop which, at the pertinent capacity and pressures, is an important factor.

Fig. 7 shows the construction and arrangement of one of two primary superheater sections 164 and 166 the main parts of which (such as the banks 170—173 of horizontal tubes) are disposed in the side downflow gas passes 148 and 150. The construction and arrangement of the banks of tubes of each of the primary superheater sections 164 and 166 is similar to the construction and arrangement of the reheater 96, one main exception being that each primary superheater section has no intermediate bifurcations.

The primary superheater sections are similar in design, function and arrangement, and the specific disclosure of one of these sections in Fig. 7 of the drawings and the pertinent description, is considered sufficient to disclose the details of both sections.

The primary superheater section 164 shown specifically in Fig. 7 is supplied with steam from the drum 20 through connections including the saturated steam conduits 180 leading from the drum 20 to the primary superheater inlet header 182. The steam flow continues downwardly from this header through the row of tubes 184 which continue through the roof segments 186, and then through the tube segments 188 along the rear wall 190 of the pertinent side downflow gas pass. At the bottom of this gas pass the wall tube segments communicate with the middle part of the header 192 which is preferably U-shaped with its two legs extending along the side walls of the gas pass. One of such legs is indicated at 194 in Figs. 1 and 7. Each leg receives steam from gas pass side wall superheater tubes such as 196. The latter, in turn, receive steam from the upper side wall superheater header 198 which has a counterpart at the opposite side of the pertinent gas pass. Superheater supply conduits 200 connect the header 198 with the steam space of the drum 20. Superheated steam passes from the header 192 through rows of tubes forming, in succession, the banks of tubes 170, 171, 172 and 173.

Superheated steam flow continues from the bank of tubes 173 through the screen tube groups 202 and 104 extending across horizontal gas flow to the gas turning chamber 36. Thence the flow continues through the bank 206 of upright tube segments to the primary superheater outlet header 208.

The furnace 10 is divided by spaced groups 210 and 212 upright division wall tubes which separate the secondary superheater into two like units, one of which is described above. The inlet header 122 at the right hand side of the unit receives superheated steam from the left hand primary superheater outlet header 208 through crossover connections including an attemperator 214. Conversely, the inlet header 122 on the left hand side of the unit receives superheated steam from the right hand primary superheater outlet header 208 through similar cross-over connections.

Referring again to the recycled gas systems as they are indicated in Figs. 1, 5 and 6, the tempering gas flow from the chamber 80 and into the furnace through the ports 114 may be controlled by multiple louvre dampers at the positions X and Y (Fig. 5), at the opposite ends of the duct or chamber 80. The pertinent multiple louvre damper means and the control therefor may be such as clearly indicated and described in the applicant's co-pending application 278,872, filed March 27, 1952. Similar multiple louvre dampers may be also disposed at the opposite ends of the recirculated gas entry chamber or duct 82, at the positions indicated at W and Z in Fig. 5. Also, the total flow of recycled gases may be controlled from pertinent operative variables by a similar multiple louvre damper construction in the ductwork leading to the inlet on the recycled gas fan 84. Such provision of multiple louvre damper regulation is indicated at R in Fig. 6. This figure also discloses a regenerative air heater 230 receiving furnace gases through the ductwork 232 leading from the economizer 92. These gases, after passing through the air heater, are conducted by the ductwork 234 to the atmosphere.

Fig. 6 also indicates a forced draft fan 236 supplying air to the air heater 230 through the ductwork 238. The heated air passes from the air heater 230 through ductwork components 240—242 to the windbox 244 through which combustion air is supplied to the burners 60—63 and 116.

As indicated in Figs. 4 and 8 of the drawings, the recycled gas ports leading from the entry chamber 82 are arranged in uniformly spaced groups of two, lengthwise of the chamber 82. The pertinent constructions providing such ports are shown on a larger scale in Fig. 8 wherein the ports 112a and 112b are indicated. To provide these ports certain of the wall tubes 14, such as the tubes 14a and 14b, have portions bent out of their wall alignment to such positions as those indicated at 14c and 14d, respectively. Above the horizontal zone of the ports these tubes are bent back into their furnace wall alignment. Similarly, for the port 112b, the furnace wall tubes 14e and 14f are bent out of their wall alignment to the positions indicated at 14g and 14h. The sides of the port 112a are formed by plates welded to the bent out portions 14c and 14d and welded to the transversely aligned tubes 14j and 14m. Such plates are indicated at 250 and 252 in Fig. 8. Similarly, at the opposite side of the port 112a, similar plates 254 and 256 are welded to the tube 14m and the bent out portion 14d of tube 14b. The sides of the adjacent port 112b are formed by similarly arranged and similarly constructed plates 260—263. The tops and bottoms of the ports (or passages leading to the ports) may be formed by appropriate stud plates welded to the pertinent tubes, as indicated in Figs. 3, 4 and 5 of my co-pending application referred to above.

The flow of recycled gases through the various ports, from the chambers 80 and 82 of the furnace, may be controlled and/or deflected upwardly or downwardly into the furnace in a regulated manner by providing each port with the multiple louvered damper or deflector construction shown and described in detail in my above identified pending application. Preferably, the upright planes through the center lines of the pivots of the louvres of such dampers or deflectors will be vertical and coincident with or close to plates passing through the upright axes of the bent out tube portions such as those indicated at 14c, 14d, 14g and 14h in Fig. 8. The louvres of the pertinent deflectors or dampers may be controlled through appropriate operating means, such as those referred to and described in my co-pending application, and including such operating components as those indicated at 270—277 in Fig. 8.

Although the invention has been described with reference to the details of preferred embodiments, it is to be understood that the invention is not to be considered as limited to all of the details thereof. It is rather to be taken as of a scope commensurate with the scope of the subjoined claims.

What is claimed is:

1. In a high capacity and high temperature vapor generating and superheating unit, a vertically elongated furnace having vapor generating tubes along its walls, means for firing the furnace with a slag-forming fuel, means forming a gas pass leading from the furnace, a superheater having a part exposed to radiant heat transmission from the highest gas temperature zone of the furance and having another part subject to flow of furnace gases in the gas pass, means for projecting recirculated and partially cooled combustion products in streams transversely of the furnace at a position downstream of the fuel burning means, means for projecting into the furnace tempering gases in the form of partially cooled combustion gases, said tempering gas introduction means having an outlet chamber and outlet ports along a wall of the furnace at a position intermediate the superheater zone and the zone of furnace firing, and additional fuel burning means disposed between the position of tempering gas introduction into the furnace and the position of recirculated gas introduction into the furnace, the superheater having tubes receiving the vapor generated in the vapor generating tubes.

2. In a high temperature and pressure vapor generating and superheating unit, vapor generating tubes delineating the walls of a furnace and receiving heat radiantly transmitted from the products of combustion within the furnace, vertically spaced fuel burners at the lower part of the furnace, said tubes and associated wall means being so arranged and constructed as to provide a furnace gas outlet at the upper part of the furnace, other wall means forming a convection gas pass leading from the furnace gas outlet, convection vapor superheating means disposed within the gas pass and receiving vapor generated in the furnace wall tubes, and a furnace gas recirculating system including a fan and ductwork having an inlet downstream of the superheating zone and having vertically spaced outlets at a position vertically intermediate the positions of said burners and said furnace gas outlet for the movement of recirculated gases into the furnace.

3. In a high temperature and pressure vapor generating and superheating unit; vapor generating tubes delineating the walls of a furnace and receiving heat radiantly transmitted from the products of combustion within the furnace; vertically spaced fuel burners for firing the furnace; said tubes and associated wall means being so arranged and constructed as to provide a furnace gas outlet remote from the zone of the burners in a vertical sense; other wall means forming a convection gas pass leading from the furnace outlet; a convection vapor superheating means disposed within the gas pass and within said furnace adjacent said gas outlet and receiving vapor generated in the furnace wall tubes; and a furnace gas recirculating system including a fan and ductwork having an inlet downstream, in a gas flow sense, from the superheating zone and having vertically spaced outlets for the movement of recirculated gases into the furnace at positions vertically intermediate the positions of said burners and said furnace gas outlet.

4. In a high temperature and pressure vapor generating and superheating unit, vapor generating tubes delineating the walls of a vertically elongated slag tap furnace and normally receiving heat radiantly transmitted from the products of combustion within the furnace; fuel burners for firing the furnace with a slag forming fuel, said tubes and associated wall means being so arranged and constructed as to provide a furnace gas outlet vertically remote from the zone of the burners, the fuel burners being disposed at positions in the lower part of the furnace successively vertically more remote from the gas outlet of the furnace, other wall means forming a convection gas pass leading from a furnace outlet, convection vapor superheating means disposed within the gas pass and receiving vapor generated in the furnace wall tubes, other fuel burners positioned intermediate said first named burners and said furnace gas outlet, and a furnace gas recycling system including a fan and ductwork having an inlet downstream of the superheating zone and having outlets vertically spaced on opposite sides of said last named fuel burners for the controlled introduction of recirculated gases into the furnace.

5. In a steam generating and superheating unit of high capacity, vapor generating tubes included in the walls of a furnace to receive heat radiantly transmitted from the products of combustion within the furnace, division wall tubes extending through the furnace, a high temperature secondary convection superheater disposed on each side of the division wall, means forming a plurality of parallel downflow gas passes receiving gases from the above specified gas passes, said plurality of parallel gas passes including a middle reheater gas pass and symmetrically arranged primary superheater gas passes on opposite sides of the middle pass, a convection reheater having a bank of tubes disposed in the middle gas pass, a separate primary convection superheater for each of the side gas passes, each primary superheater having its own outlet header, crossover means including attemperators and associated conduits separately conducting superheated vapor from the left hand primary superheater to the right hand secondary superheater and also separately conducting superheated steam from the right hand primary superheater to the left hand secondary superheater.

6. In a high pressure and high capacity steam generating and steam superheating unit, a slag tap furnace of large volume having its walls and floor normally cooled by closely arranged steam generating tubes, fuel burning means disposed in a zone adjacent the furnace floor and adapted to fire the furnace with a slag forming fuel, high temperature refractory means lining the walls of the furnace in the zone of said fuel burning means and covering the floor tubes, other wall means associated with some of said steam generating wall tubes to form a furnace gas outlet means forming a gas pass communicating with the outlet, a steam superheater including tubes receiving the steam generated in the furnace wall tubes and exposed to the heat of the furnace gases beyond the furnace gas outlet and in the gas pass, other fluent fuel burning means disposed in a position intermediate the furnace gas outlet and the first mentioned fuel burning means and spaced substantially therefrom, recirculated gas entry means communicating with the interior of the furnace at a position upstream of said other fuel burning means in a gas flow sense, tempering gas entry means including ports communicating with the interior of the furnace at a position adjacent the furnace gas outlet and between said outlet and the other fuel burning means, and a recycled gas system conducting partially cooled heating gases from a position downstream of the superheater to the recirculated gas entry means and to the tempering gas entry means, said system including gas flow regulating means normally directing at least the predominant proportion of the recycled gases to the tempering gas entry means at high load and conducting at least a predominant proportion of the recycled gases to the recirculated gas entry means at low loads.

7. The combination of claim 6 further characterized by the disposition of at least a part of the superheater at one side of the high temperature zone of the furnace.

8. The combination of claim 7 further characterized by the disposition of some of the furnace wall steam generating tubes in arch forming relation at a position adjacent the furnace gas outlet and adjacent the gas pass and the superheater within the higher temperature zone of the furnace.

9. The combination of claim 8 further characterized by the disposition of the tempering gas entry means at a position directly opposite the nose of said arch but at a level slightly below the level of the arch.

10. In a high temperature high capacity vapor generating and superheating unit, a vertically elongated slag tap furnace the walls of which involve vapor generating tubes, vertically spaced fuel burning means including pulverized fuel burners for firing the furnace, means forming a gas pass leading from the furnace, a vapor superheater having a low temperature section in the gas pass and having a high temperature section directly exposed to the radiant transmission of heat from the fuel burning in said furnace, and a recirculated gas system including appropriate ductwork and a fan for projecting streams of partially cooled combustion gases into the furnace transversely of the furnace gas flow at a position adjacent the burners and in the space between the vertically spaced fuel burning means and the high temperature section of said superheater, the superheater having tubes receiving the vapor generated in the generating tubes.

References Cited in the file of this patent

UNITED STATES PATENTS

| | | |
|---|---|---|
| 2,035,763 | Robinson | Mar. 31, 1936 |
| 2,312,375 | Whitney | Mar. 2, 1943 |
| 2,619,411 | Wilcoxson | Nov. 25, 1952 |

FOREIGN PATENTS

| | | |
|---|---|---|
| 514,687 | Belgium | Oct. 31, 1952 |
| 955,787 | France | July 4, 1949 |
| 504,114 | Great Britain | Apr. 14, 1939 |
| 675,410 | Great Britain | July 9, 1952 |
| 523,872 | Great Britain | July 24, 1940 |
| 827,384 | Germany | Jan. 10, 1952 |

OTHER REFERENCES

Mechanical Engineering of November 1952, pages 878 to 881.

B & W Bulletin G67–A of 1950, page 41.